(12) United States Patent
Schroeder

(10) Patent No.: US 8,821,109 B2
(45) Date of Patent: Sep. 2, 2014

(54) DEVICE FOR DETECTING THE AXIAL POSITION OF A ROTARY SHAFT AND ITS APPLICATION TO A TURBO-MOLECULAR PUMP

(75) Inventor: Ulrich Schroeder, Mont Saint-Aignan (FR)

(73) Assignee: SKF Magnetic Mechatronics, Saint Marcel (FR)

( * ) Notice: Subject to any disclaimer, the term of this patent is extended or adjusted under 35 U.S.C. 154(b) by 360 days.

(21) Appl. No.: 13/442,160

(22) Filed: Apr. 9, 2012

(65) Prior Publication Data

US 2012/0263577 A1 Oct. 18, 2012

(30) Foreign Application Priority Data

Apr. 14, 2011 (FR) ..................................... 11 53227

(51) Int. Cl.
| | | |
|---|---|---|
| F04D 29/00 | (2006.01) | |
| G01B 7/30 | (2006.01) | |
| G01D 5/20 | (2006.01) | |
| F04D 27/00 | (2006.01) | |
| F04D 29/051 | (2006.01) | |
| F04D 29/058 | (2006.01) | |

(52) U.S. Cl.
CPC ............. G01D 5/2013 (2013.01); F04D 27/001 (2013.01); F04D 29/051 (2013.01); F04D 29/058 (2013.01)
USPC .......... 415/90; 415/118; 415/170.1; 415/229; 416/61; 416/174

(58) Field of Classification Search
USPC ........... 415/90, 118, 132, 170.1, 229; 416/61, 416/174
See application file for complete search history.

(56) References Cited

U.S. PATENT DOCUMENTS

| | | | |
|---|---|---|---|
| 4,023,920 A * | 5/1977 | Bachler et al. ................... | 415/90 |
| 5,152,679 A | 10/1992 | Kanemitsu et al. | |
| 5,542,825 A * | 8/1996 | Perrillat-Amede et al. ......................... | 417/423.4 |
| 5,613,831 A * | 3/1997 | Liegat ............................ | 415/229 |
| 6,644,938 B2 * | 11/2003 | Omori ............................. | 415/90 |
| 6,793,466 B2 * | 9/2004 | Miyamoto .................... | 415/177 |
| 7,090,469 B2 * | 8/2006 | Blumenthal et al. ............ | 417/32 |
| 8,083,468 B2 * | 12/2011 | Blumenthal .................. | 415/110 |
| 2005/0212510 A1 | 9/2005 | Kirchdoerffer et al. | |
| 2007/0132327 A1 | 6/2007 | Brunet | |
| 2011/0176910 A1 | 7/2011 | Schroeder et al. | |

FOREIGN PATENT DOCUMENTS

| | | |
|---|---|---|
| EP | 0 311 128 | 10/1987 |
| EP | 0 470 637 | 2/1992 |
| EP | 1 580 889 | 9/2005 |
| FR | 2 936 287 | 3/2010 |
| WO | WO2005/038263 | 4/2005 |

* cited by examiner

Primary Examiner — Igor Kershteyn
(74) Attorney, Agent, or Firm — Hamre, Schumann, Mueller & Larson, P.C.

(57) ABSTRACT

A device for detecting the axial position of a rotary shaft of a rotary machine comprises a target of ferromagnetic material placed at the end of the rotary shaft, an induction coil associated with a stationary magnetic circuit and placed facing the target while leaving an airgap, and a power supply circuit. The power supply circuit comprises an AC voltage source connected between a first end of the induction coil and a zone situated at a reference voltage, at least one capacitor connected between the ends of the induction coil, and a detector device interposed between a second end of the induction coil and the zone situated at the reference voltage, in order to deliver on a line information about the magnitude of the current flowing between the second end and the zone situated at the reference voltage.

10 Claims, 4 Drawing Sheets

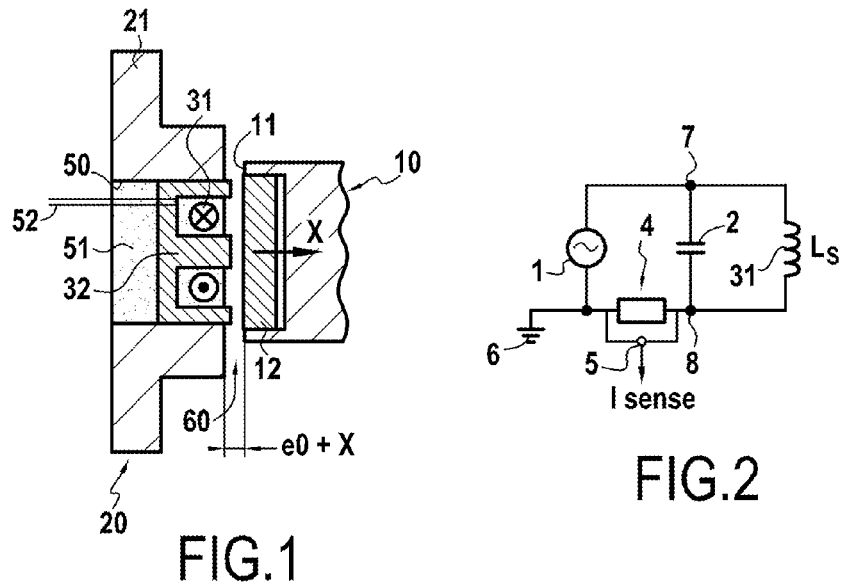
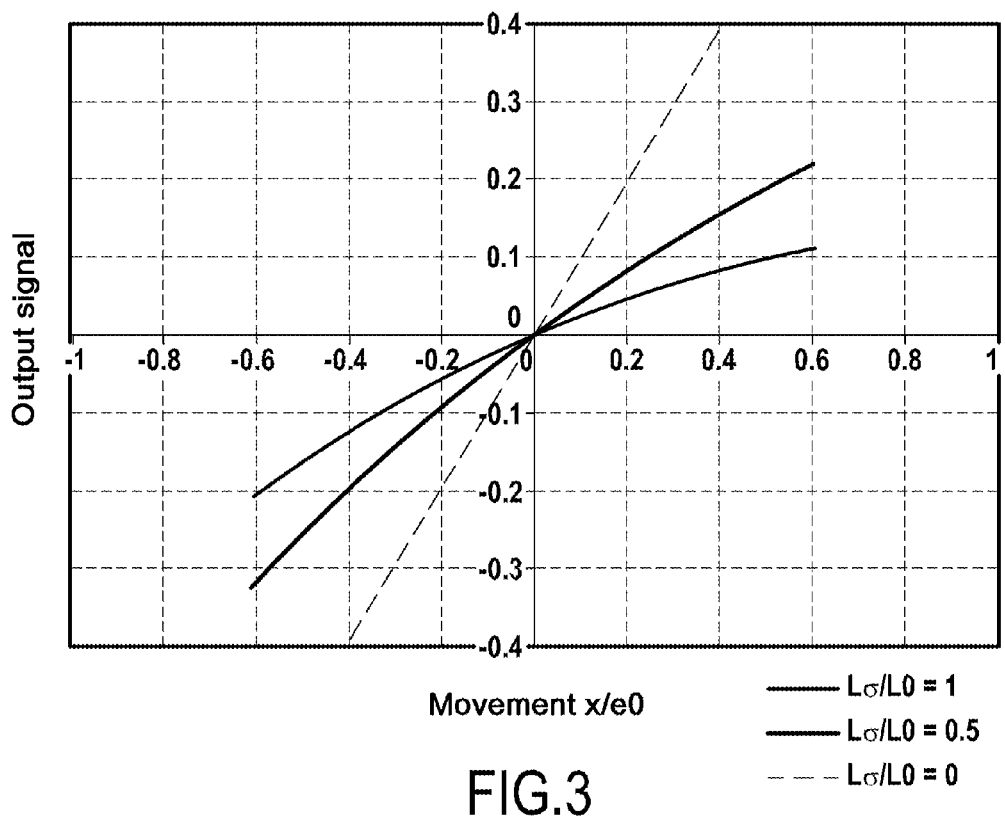

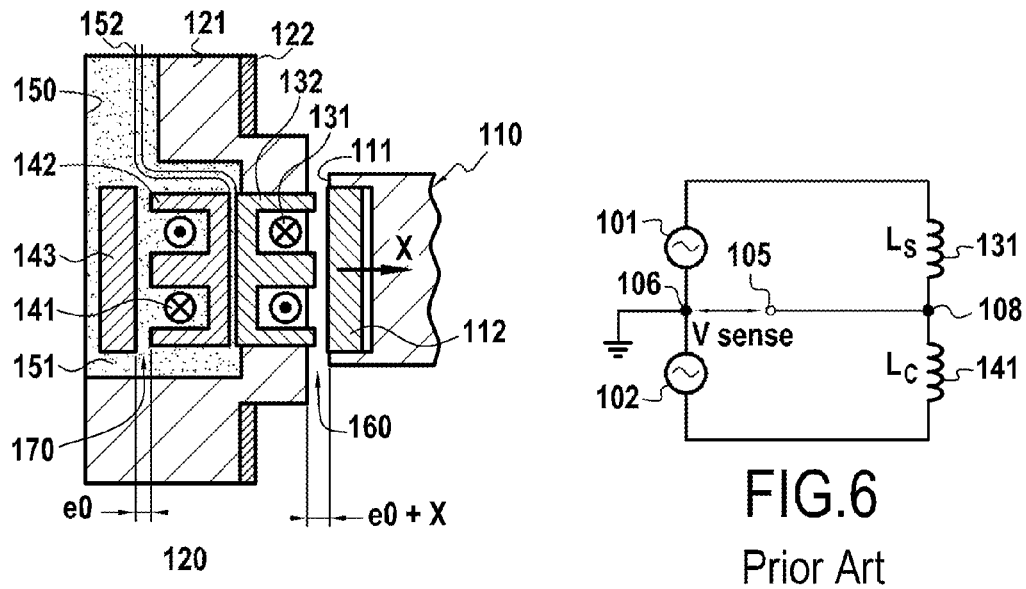
FIG.5
Prior Art
FIG.6
Prior Art
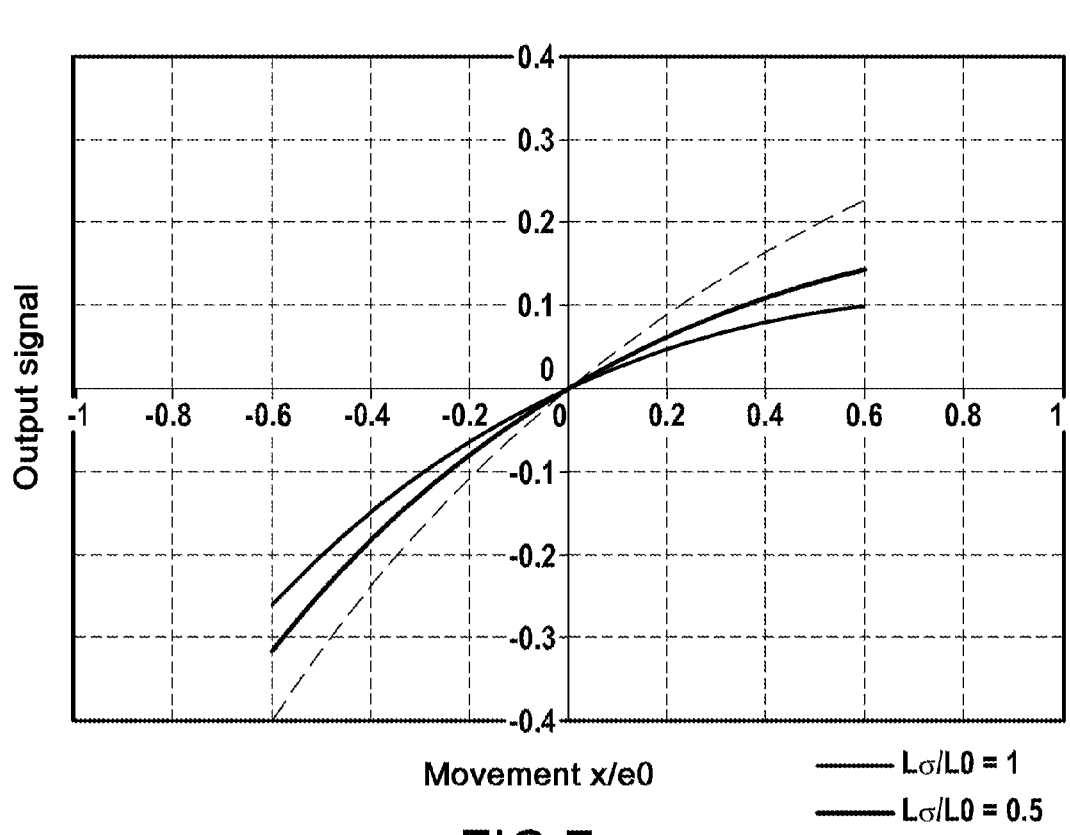
FIG.7
Prior Art

DEVICE FOR DETECTING THE AXIAL POSITION OF A ROTARY SHAFT AND ITS APPLICATION TO A TURBO-MOLECULAR PUMP

FIELD OF THE INVENTION

The present invention relates to a device for detecting the axial position of a rotary shaft of a rotary machine, the device comprising a target of ferromagnetic material placed at the end of said rotary shaft, an induction coil associated with a stationary magnetic circuit secured to the stator of the rotary machine and placed facing said target while leaving an airgap, and a power supply circuit for powering said induction coil.

PRIOR ART

Turbo-molecular vacuum pumps, each having active magnetic bearings, being fitted with radial magnetic bearings and with an axial magnetic bearing that is associated with an axial detector, are known in particular from documents WO 2005/038263 A1, EP 0 470 637 A1, and FR 2 936 287 A1.

Among variable-induction type inductive axial detection detectors for fitting to turbo-molecular pumps, one particular known type of axial detector has a "compensation" induction coil and is described below with reference to FIGS. 5 to 7.

FIG. 5 shows a prior art axial detector comprising a ferrite target 112 arranged at one end 111 of a rotary shaft 110. The target 112 mounted at the end of the shaft may be mounted on a nut for fastening a radial disk that is used as an armature of an axial magnetic bearing.

The stator portion 120 of the detector comprises an induction coil 131 associated with a stationary magnetic circuit 132 that may be constituted by a ferrite pot (e.g. having a diameter of 14 millimeters (mm)) that is mounted in a housing 121 secured to the stator of the machine. The free end of the stationary magnetic circuit 132 is arranged to face the target 112, while leaving an airgap 160 that may typically present a nominal value $e_0$ of 0.5 mm.

The stator portion 120 of the detector also includes a compensation induction coil 141 incorporated in a stationary magnetic circuit 142 that may likewise be constituted by a ferrite pot presenting the same dimensions as the magnetic circuit 132. The magnetic circuit 142, the compensation induction coil 141, and a ferrite pellet 143 placed facing the magnetic circuit 142, while leaving a stationary airgap 170 of nominal value $e_0$, are arranged along the axis of the shaft 110 in symmetrical manner relative to the magnetic circuit 132, to the induction coil 131, and to the target 112 (when it is defining the nominal airgap $e_0$), and relative to a plane perpendicular to the axis of the rotor 110, Wires 152 connected to the coils 131 and 141 are arranged in a space 150 that may be filled with epoxy resin 151.

A removable spacer 122 of stainless steel is mounted on the housing 121 of the stator portion 120 of the detector and is in the form of an annular disk centered about the axis of the shaft 110. The removable spacer 122 serves to perform mechanical adjustment for the purpose of "centering" the detector in the emergency rolling bearings associated with the shaft 110.

As shown in FIG. 6, the induction coils 131 and 141 are separate from the electronic card and they are powered by a bridge circuit from two alternating current (AC) voltage sources 101 and 102 that, by way of example, are capable of delivering 10 volts (V) at 25 kilohertz (kHz).

A point 106 that is common to both excitation voltage sources 101 and 102 is connected to ground, whereas the other output terminal of each of the excitation voltage sources 101, 102 is connected to one end of a respective one of the coils 131 and 141. The other ends of the coils 131 and 141 are connected together at a point 108 from which a wire 105 enables an output voltage $V_{sense}$ to be taken that is representative of the variation $\underline{x}$ in the value $e_0+x$ of the variable axial airgap 160 as a function of variations in the position of the rotor 110, while the value $e_0$ of the reference axial airgap 170 remains constant.

If the inductance of the detection coil 131 is written $L_s$, the inductance of the compensation coil 141 is written $L_c$, the nominal inductance is written $L_0$, and the leakage inductance of each of the coils 131 and 141 is written $L_\sigma$, then the following equations apply:

$$L_c = L_0 + L_\sigma \qquad (1)$$

$$L_s = L_0/(1+x/e_0) + L_{94} \qquad (2)$$

If the voltage delivered by each of the voltage sources 101 and 102 is written $\underline{u}$, and the voltage that is modified as a function of the value $\underline{x}$ of the movement of the shaft 110 is written $u_L$, which movement of the shaft 110 modifies the value of the inductance $L_s$ as given by equation (2) above, then the following relationship applies to the measurement voltage on the output wire 105:

$$u_L/u = \frac{x/e_0}{(2L_\sigma/\sigma_0)*(1+x/e_0) + x/e_0 + 2} \qquad (3)$$

When the leakage inductance $L_\sigma$ can be considered as being negligible, i.e. $L_{\sigma/L0} \ll 1$, then the following relationship applies:

$$u_L/u = \frac{x/e_0}{x/e_0 + 2} \qquad (4)$$

FIG. 7 plots curves giving the value of the output signal as a function of the movement $x/e_0$ for three levels of leakage inductance (equation (3)).

It can be seen that these curves are not very linear, even when leakage is negligible ($L_{\sigma/L0} \ll 1$).

For large movements, the amount of non-linearity becomes very large.

The above-described axial detector shown. in FIGS. 5 to 7 presents many drawbacks.

Its poor linearity is a first drawback, making any attempt at "electrical" centering dubious and making it necessary for mechanical centering to be implemented by using removable spacers.

Using a compensation coil 141 increases the axial dimension, i.e. the link of the device.

The number of mechanical parts for assembling together is large, thereby making adjustment complex and giving rise to high costs.

Documents EP 1 580 889 A1 and EP 0 311 128 A1 disclose inductive type proximity detectors using eddy currents that include a stator coil that is "in the air", i.e. that does not have a magnetic body, and that use a target on the rotor that is a non-magnetic electrical conductor, e.g. made of aluminum or steel. With detectors of those types, the coil induces eddy currents in the target and the amount of energy that is absorbed varies as a function of the distance between the coil and the target. It is then possible to estimate the position of the target by measuring the power absorbed by the eddy currents in the target. In such eddy current systems, it is necessary to adjust the offset and the sensitivity. In addition, those systems make use of switching devices in order to reduce energy consumption, thereby complicating implementation.

OBJECT AND BRIEF SUMMARY OF THE INVENTION

An object of the present invention is to remedy the above-mentioned drawbacks of known axial detectors.

The invention seeks in particular to obtain better linearity of detection, to simplify implementation, and consequently to reduce the cost of fabricating a detector for detecting the axial position of a rotary shaft.

In accordance with the invention, these objects are achieved by a device for detecting the axial position of a rotary shaft of a rotary machine, the device comprising a target of ferromagnetic material placed at the end of said rotary shaft, an induction coil associated with a stationary magnetic circuit secured to a structure of the rotary machine and placed facing said target while leaving an airgap, and a power supply circuit for powering said induction coil, wherein the circuit for powering the induction coil comprises an AC voltage source connected between a first end of the induction coil and a zone situated at a reference voltage, at least one capacitor connected between said first end of the induction coil and a second end of the induction coil, and a detector device interposed between said second end of the induction coil and said zone situated at said reference voltage, in order to deliver on a line information about the magnitude of the current flowing between said second end of the induction coil and said zone situated at the reference voltage, said information representing the value of a modification $\underline{x}$ to the width of said airgap that presents a predetermined nominal value $e_0$.

The capacitance C of the capacitor is given by the inductance $L_0$ of the induction coil for an airgap having a nominal value $e_0$ by the following formula in which $\omega$ represents the angular frequency of the signal delivered by the AC voltage source:

$$C=1/(\omega^2 L_0)$$

The target may be made of ferrite or it may be constituted by a ferromagnetic lamination or by a stack of ferromagnetic laminations.

The stationary magnetic circuit may likewise be made of ferrite or it may be constituted by a stack of ferromagnetic laminations.

The AC voltage source may be a simple oscillator without a transformer.

The invention enables electrical centering to be performed, and there is no longer any need to perform mechanical centering, e.g., with a removable adjustment spacer.

Eliminating the compensation coil and its associated magnetic circuit facilitates implementation, since it is much simpler to use a capacitor that is located on a card together with other electronic components.

The invention also provides a turbo-molecular vacuum pump with active magnetic bearings, the pump comprising a rotor mounted on radial magnetic bearings and on an axial magnetic bearing, wherein the pump includes a detector device for detecting the axial position of the rotor as defined above.

BRIEF DESCRIPTION OF THE DRAWINGS

Other characteristics and advantages of the invention appear from the following description of particular embodiments, given as non-limiting examples and with reference to the accompanying drawings, in which:

FIG. 1 is a diagrammatic axial section view of an example of an axial detector of the invention;

FIG. 2 is an electrical circuit diagram of the power supply and measurement circuits associated with the FIG. 1 detector device;

FIG. 3 is a graph showing how the output signal varies as a function of the movement that is to be measured in an example of the detector device of the invention;

FIG. 5 is a diagrammatic axial section view of an example of a prior art axial detector that implements a compensation coil;

FIG. 6 is an electrical circuit diagram of the power supply and measurement circuits associated with the prior art detector device of FIG. 5;

FIG. 7 is a graph plotting the variation in the output signal as a function of the movement that is to be measured for an exemplary prior art detector device as shown in FIGS. 5 and 6.

DETAILED DESCRIPTION OF PARTICULAR EMBODIMENTS

Figure 8:
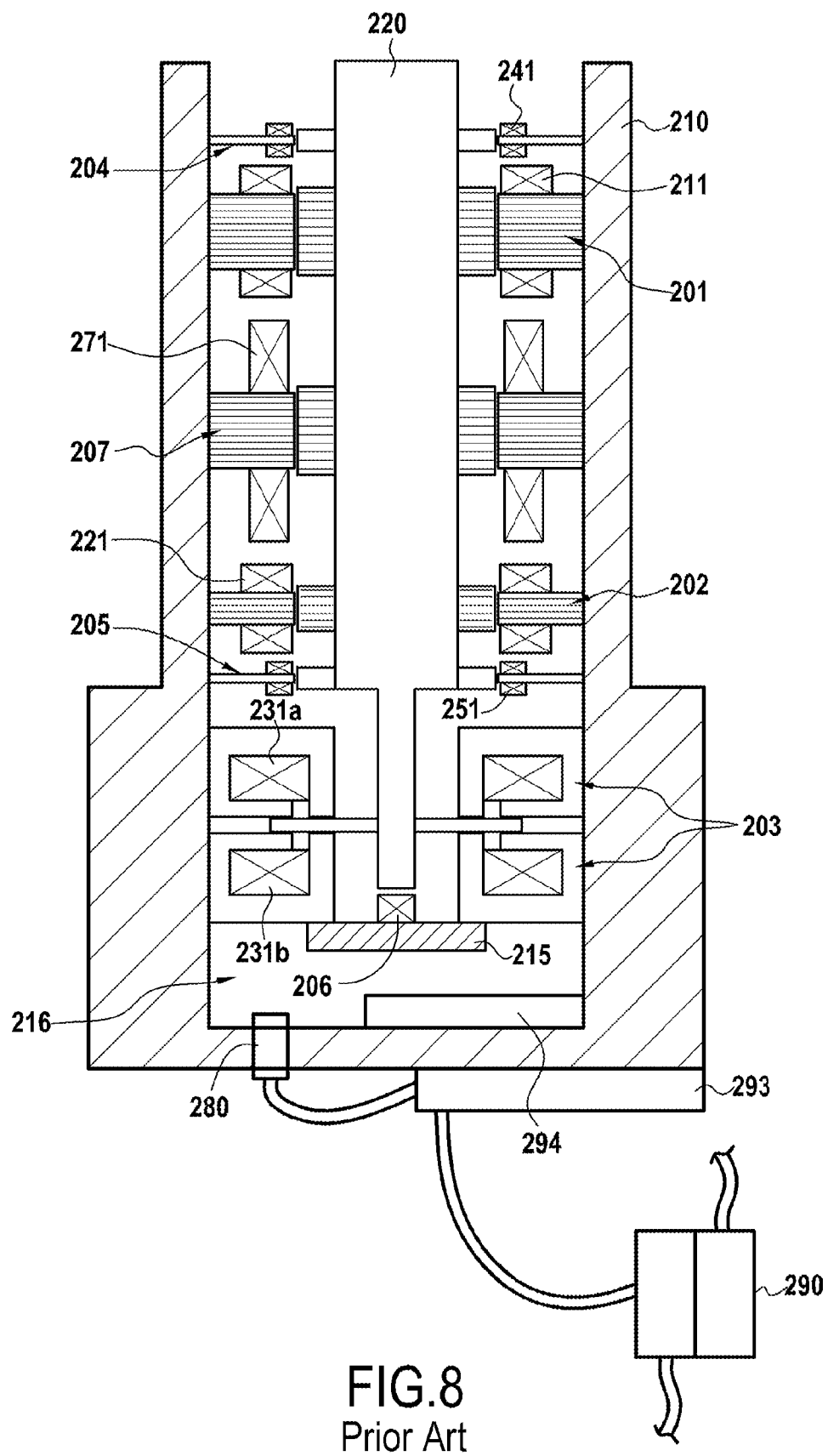
FIG. 8 is a diagrammatic axial section view of an example of a turbo-molecular vacuum pump with magnetic bearings to which the invention is applicable.

The description begins with reference to FIG. 8 that shows an example of a prior art turbo-molecular vacuum pump that may be modified in accordance with the invention, however the invention may naturally be applied to other types of rotary machine that need to be fitted with an axial detector.

The turbo-molecular vacuum pump comprises an enclosure 210 defining a primary vacuum chamber 216, a rotor 220, an electric motor 207, an axial magnetic bearing 203, radial magnetic bearings 201, 202, an axial detector 206, and radial detectors 204, 205.

The stators of the radial magnetic bearings 201, 202 and the stator of the electric motor 207 have respective windings 211, 221, and 271. The stators of the axial abutment 203, situated on either side of a rotor armature in the form of a disk perpendicular to the rotor 220 and secured thereto have windings 231a and 231b.

The radial detectors 204, 205 of the inductive type have respective windings 241 and 251.

The axial detector 206 of FIG. 8, represented by a winding secured to a support 215 and placed facing the end of the rotor 220, is often made in the prior art together with a compensation coil in the manner described above with reference to FIGS. 5 to 7.

In the present invention, the detector 206 is made specifically in accordance with the embodiments that are described below with reference to FIGS. 1 to 3.

In the exemplary application of FIG. 8, there can be seen control circuits 294 for controlling the axial and radial magnetic bearings 203 and 201, 202 on the basis of signals delivered by the axial and radial detectors 206 and 204, 205, which detectors are embedded in resin and arranged inside the enclosure 210 in the primary vacuum chamber 216 and connected via a leaktight electrical connector 280 and electrical cables to external circuits 293, 290, however the present invention is independent of the manner in which the control circuits are made and is therefore not limited to this exemplary application.

With reference to FIG. 1, there can be seen an embodiment of the invention. in which a target 12 of ferromagnetic material is arranged at the end 11 of a rotary shaft 10 of axial position that is to be measured, The target 12 may be made of ferrite or of a ferromagnetic lamination, or indeed it may be constituted by a stack of ferromagnetic laminations.

A detector stator 20 is arranged in stationary manner facing the target 12 so as to leave an airgap 60 having a nominal value $e_0$ that may for example be about 0.5 mm, and presenting a real value $e_0+x$ that presents variations in the value of $\underline{x}$ as a function of variations in the position of the shaft 10.

The axial detector stator 20 has an induction coil 31 associated. with a magnetic circuit 32 placed in a housing 21 secured to the structure of the rotary machine that is fitted with the shaft 10.

The magnetic circuit 32 may be constituted by a ferrite pot of dimensions that are adapted to requirements, but that may present traditional values (e.g. a diameter of 14 mm). The magnetic circuit 32 may also be constituted by a stack of magnetic laminations. Unlike the prior art embodiments described above with reference to FIGS. 5 to 7, no compensation coil is associated with the coil 31.

The connection wires of the coil 31 may pass through a space 50 that may be filled with an epoxy resin 51.

FIG. 2 shows an example of a circuit for powering the induction coil 31.

An AC voltage source 1, which may be constituted by a simple oscillator without a transformer, is connected between a first end 7 of the coil 31 and a point 6 that is at a reference voltage, such as ground. A capacitor 2 is connected in parallel with the coil 31 between its first and second ends 7 and 8.

A current detector device (a shunt) is arranged between the second end 8 of the coil 31 and the point 6 at said reference voltage, such as ground. The detector device delivers information $i_L$ on a line about the value of the current flowing between the end 8 of the coil 31 and the point 6 that is at ground potential (0 V). The current information $i_L$ represents the value of a modification $\underline{x}$ in the width of the airgap 60.

The capacitance C of the capacitor is given from the inductance $L_0$ of the detector coil 31 for an airgap 60 of nominal value $e_0$ in application of the following formula (where $\omega$ represents the angular frequency of the signal delivered by the oscillator 1)

$$C = 1/(\omega^2 L_0) \quad (5)$$

The inductance L the detector coil 31 for an axial movement $\underline{x}$ of the shaft 10 is given by the following formula, where $L_\sigma$ represents the leakage inductance:

$$L_s = L_0/(1+x/e_0) + L_\sigma \quad (6)$$

The value of the detection current $i_L$ (or $I_{sense}$) as measured on the line 5 of the circuit in FIG. 2 may then be expressed as a function of the axial movement $\underline{x}$ of the shaft 10 by the following formula:

$$i_L = \frac{u}{\omega L_0} * \frac{x/e_0 + 1}{(L_\sigma/L_0)*(1+x/e_0)+1} - \frac{u}{\omega(L_\sigma/L_0)} \quad (7)$$

When the leakage inductance $L_\sigma$, can be considered as being negligible ($L_\sigma/L_0 \ll 1$), then the following relationship applies:

$$i_L = \frac{u * x/e_0}{\omega L_0} \quad (8)$$

From above formula (8) it can be seen that the information about the position $\underline{x}$ is proportional to the current $i_L$ in the circuit shown in FIG. 2 (current $I_{sense}$ taken from line 5).

Compared with the prior art device as described with reference to FIGS. 5 and 6, it is a current that is detected rather than a voltage, and a capacitor is used presenting capacitance that is easy to determine [as a function of the inductance $L_0$ of the coil 31 for an airgap 60 having a nominal value $e_0$ (see equation (5))], which does not imply any need for adjustment, nor any need for a compensation coil 141, unlike the prior art.

FIG. 3 plots curves giving the value of the output signal on the line 5 as a function of the relative movement $x/e_0$ for three different values of leakage inductance.

It can be seen that the linearity of the curves in FIG. 3 is much more pronounced than the linearity of the corresponding curves of FIG. 7 that correspond to a prior art device with a compensation coil.

Figure 4:
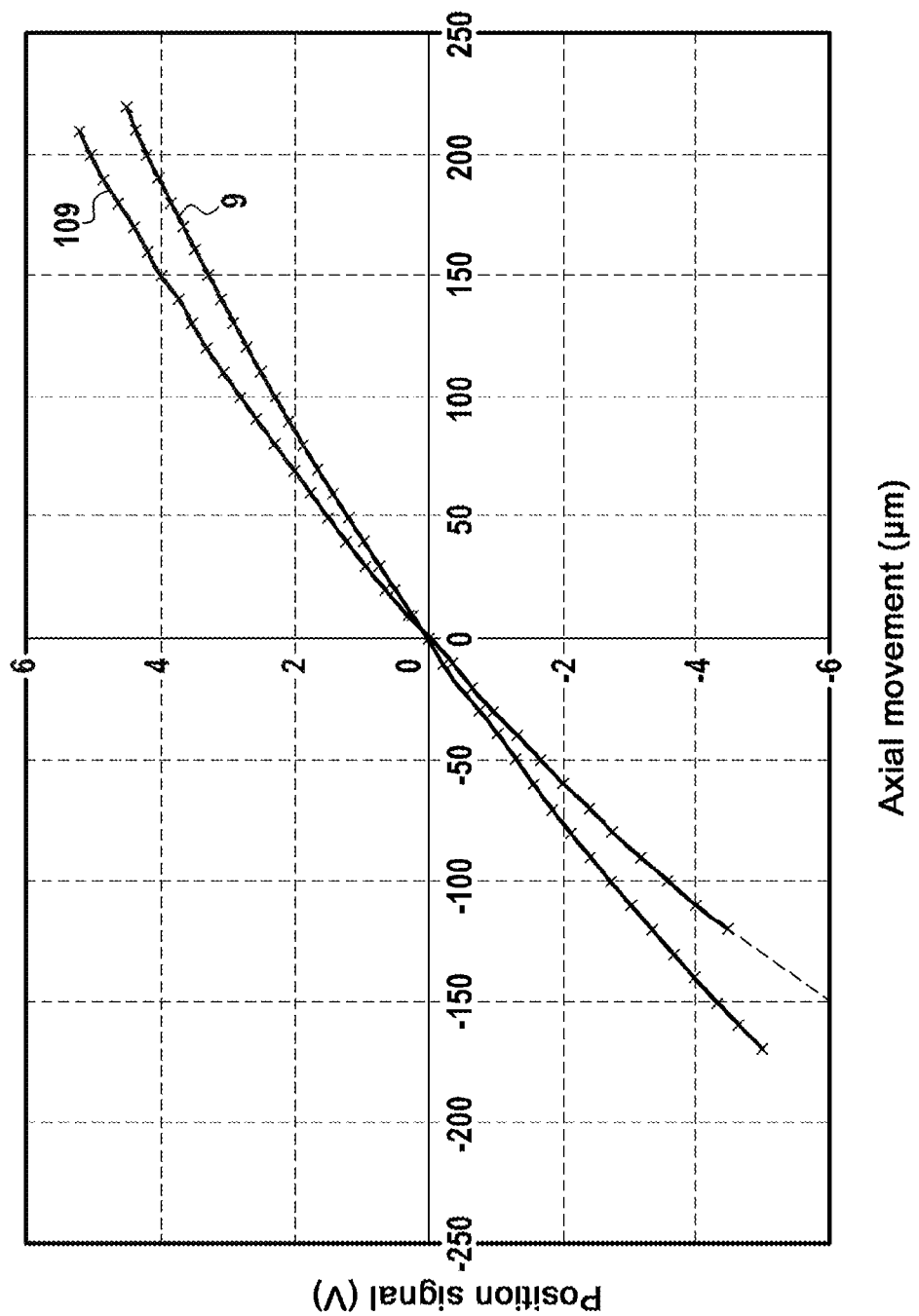
FIG. 4 is a graph showing curves analogous to those of FIG. 3 firstly for a device 9 of the invention and secondly for a prior art device 109 with a compensation coil.

FIG. 4 shows the difference in linearity as observed for curves 9 and 109 representing a position signal (in volts) from a detector device respectively of the invention (FIGS. 1 and 2) and of the prior art with a compensation coil (FIGS. 5 and 6) as a function of axial movement (in micrometers).

Although the linearity of the curve 9 is not absolutely perfect because of residual leakage inductances, it can be seen that this linearity is improved. sufficiently with the device of the invention to be able to eliminate any mechanical centering, by using a device of the type shown in FIGS. 1 and 2 that is of a structure that is simple, that does not require complex adjustment, and that is of reduced cost because of the absence of the compensation coil.

What is claimed is:

1. A device for detecting the axial position of a rotary shaft of a rotary machine, the device comprising a target of ferromagnetic material placed at the end of said rotary shaft, an induction coil associated with a stationary magnetic circuit secured to a structure of the rotary machine and placed facing said target while leaving an airgap, and a power supply circuit for powering said induction coil, wherein the circuit for powering the induction coil comprises an AC voltage source connected between a first end of the induction coil and a zone situated at a reference voltage, at least one capacitor connected between said first end of the induction coil and a second end of the induction coil, and a detector device interposed between said second end of the induction coil and said zone situated at said reference voltage, in order to deliver on a line information about the magnitude of the current flowing between said second end of the induction coil and said zone situated at the reference voltage, said information representing the value of a modification $\underline{x}$ to the width of said airgap that presents a predetermined nominal value $e_0$.

2. A device according to claim 1, wherein the capacitance C of the capacitor is given by the inductance $L_0$ of the induction coil for an airgap having a nominal value $e_0$ by the following formula in which $\omega$ represents the angular frequency of the signal delivered by the AC voltage source:

$$C = 1/(\omega^2 L_0).$$

3. A device according to claim 1, wherein said target is made of ferrite.

4. A device according to claim 1, wherein said target is constituted by a ferromagnetic lamination or by a stack of ferromagnetic laminations.

5. A device according to claim 1, wherein said stationary magnetic circuit is made of ferrite.

6. A device according to claim 1, wherein said stationary magnetic circuit is constituted by a stack of ferromagnetic laminations.

7. A device according to claim 1, wherein connection wires of the induction coil are arranged in a space filled with an epoxy resin.

8. A device according to claim 1, wherein the AC voltage source is a simple oscillator without a transformer.

9. A device according to claim 1, wherein said reference voltage is equal to 0 volt.

10. A turbo-molecular vacuum pump with active magnetic bearings, the pump comprising a rotor mounted on radial magnetic bearings and on an axial magnetic bearing, wherein the pump includes a detector device for detecting the axial position of the rotor according to claim 1.

\* \* \* \* \*